US008995679B2

(12) United States Patent
Yamkovoy

(10) Patent No.: US 8,995,679 B2
(45) Date of Patent: Mar. 31, 2015

(54) POWER SUPPLY VOLTAGE-BASED HEADSET FUNCTION CONTROL

(75) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 612 days.

(21) Appl. No.: 13/324,367

(22) Filed: Dec. 13, 2011

(65) Prior Publication Data

US 2013/0148818 A1 Jun. 13, 2013

(51) Int. Cl.
H04R 1/10 (2006.01)
H04M 1/60 (2006.01)

(52) U.S. Cl.
CPC ........... *H04R 1/1041* (2013.01); *H04M 1/6058* (2013.01); *H04R 1/1033* (2013.01); *H04R 2420/05* (2013.01); *H04R 2420/09* (2013.01)
USPC ............. 381/74; 381/384; 381/370; 381/123; 381/58

(58) Field of Classification Search
CPC ............... H04R 1/1041; H04R 1/1033; H04R 2420/05; H04R 2420/09; H04M 1/6058
USPC ............................ 381/74, 384, 370, 123, 58
See application file for complete search history.

(56) References Cited

U.S. PATENT DOCUMENTS

| | | |
|---|---|---|
| 2,797,315 A | 6/1957 | Hoist |
| 4,455,675 A | 6/1984 | Bose et al. |
| 4,494,074 A | 1/1985 | Bose |
| 4,593,696 A | 6/1986 | Hochmair et al. |
| 4,899,388 A | 2/1990 | Mlodzikowski et al. |
| 4,941,187 A | 7/1990 | Slater |
| 5,001,763 A | 3/1991 | Moseley |
| 5,105,377 A | 4/1992 | Ziegler, Jr. |
| 5,212,811 A | 5/1993 | Kuge et al. |
| 5,276,740 A | 1/1994 | Inanaga et al. |
| 5,353,347 A | 10/1994 | Irissou et al. |
| 5,396,551 A | 3/1995 | Lucey |
| 5,402,497 A | 3/1995 | Nishimoto et al. |
| 5,481,615 A | 1/1996 | Eatwell et al. |
| 5,557,653 A | 9/1996 | Paterson et al. |
| 5,604,813 A | 2/1997 | Evans et al. |
| 5,649,307 A | 7/1997 | Patino |
| 5,699,436 A | 12/1997 | Claybaugh et al. |
| 5,768,473 A | 6/1998 | Eatwell et al. |
| 5,815,582 A | 9/1998 | Claybaugh et al. |

(Continued)

FOREIGN PATENT DOCUMENTS

EP 0548836 A1 6/1993
EP 0583900 2/1994

(Continued)

OTHER PUBLICATIONS

Invitation to Pay Additional Fees dated Mar. 13, 2014 for International Application No. PCT/US2013/060107.

(Continued)

*Primary Examiner* — Paul S Kim

(57) ABSTRACT

Through a cable coupling two portions of a communications headset, conductors of the cable providing electric power from one of the portions to another are caused to do so with one of a selection of different predetermined voltage levels used to control aspects of one or more functions performed by the communications headset, including enabling or disabling functions, perhaps at least partially by controlling the manner in which the provided electric power is used.

10 Claims, 6 Drawing Sheets

(56) References Cited

U.S. PATENT DOCUMENTS

| | | |
|---|---|---|
| 5,825,897 A | 10/1998 | Andrea et al. |
| 6,108,426 A | 8/2000 | Stortz |
| 6,118,878 A | 9/2000 | Jones |
| 6,278,786 B1 | 8/2001 | McIntosh |
| 6,704,428 B1 | 3/2004 | Wurtz |
| 6,801,629 B2 | 10/2004 | Brimhall et al. |
| 6,952,481 B2 | 10/2005 | Larsen et al. |
| 7,024,230 B2 | 4/2006 | Curtiss et al. |
| 7,110,800 B2 | 9/2006 | Nagayasu et al. |
| 7,215,766 B2 | 5/2007 | Wurtz |
| 7,327,850 B2 | 2/2008 | Crump et al. |
| 7,418,103 B2 | 8/2008 | Sargaison |
| 7,590,254 B2 | 9/2009 | Olsen |
| 7,668,308 B1 | 2/2010 | Wurtz |
| 7,769,187 B1 | 8/2010 | Farrar et al. |
| 7,945,297 B2 | 5/2011 | Philipp |
| 7,983,427 B2 | 7/2011 | Yamkovoy et al. |
| 8,189,803 B2 | 5/2012 | Bergeron et al. |
| 8,222,641 B2 | 7/2012 | Yamkovoy et al. |
| 8,494,184 B2 | 7/2013 | Yamkovoy |
| 8,494,185 B2 | 7/2013 | Yamkovoy |
| 2001/0046304 A1 | 11/2001 | Rast |
| 2001/0050993 A1 | 12/2001 | Douglas |
| 2002/0141599 A1 | 10/2002 | Trajkovic et al. |
| 2003/0118197 A1 | 6/2003 | Nagayasu et al. |
| 2005/0213774 A1 | 9/2005 | Kleinschmidt et al. |
| 2005/0276421 A1 | 12/2005 | Bergeron et al. |
| 2006/0153394 A1 | 7/2006 | Beasley |
| 2007/0025561 A1 | 2/2007 | Gauger et al. |
| 2007/0038442 A1 | 2/2007 | Visser et al. |
| 2007/0121959 A1 | 5/2007 | Philipp |
| 2007/0253569 A1 | 11/2007 | Bose |
| 2008/0057857 A1 | 3/2008 | Smith |
| 2008/0107287 A1 | 5/2008 | Beard |
| 2009/0034748 A1 | 2/2009 | Sibbald |
| 2009/0046868 A1 | 2/2009 | Engle et al. |
| 2010/0278348 A1* | 11/2010 | Yamkovoy et al. ............. 381/58 |
| 2011/0268291 A1* | 11/2011 | Ha .................................... 381/74 |
| 2012/0014529 A1 | 1/2012 | Yamkovoy |
| 2012/0014530 A1 | 1/2012 | Yamkovoy |
| 2012/0014531 A1 | 1/2012 | Yamkovoy |

FOREIGN PATENT DOCUMENTS

| | | |
|---|---|---|
| EP | 0643881 B1 | 12/1998 |
| EP | 935236A A1 | 8/1999 |
| EP | 0993229 A2 | 4/2000 |
| EP | 1608202 A2 | 12/2005 |
| EP | 2384022 A2 | 11/2011 |
| GB | 2431313 A | 4/2007 |
| GB | 2433612 A | 6/2007 |
| JP | 06-070391 A | 3/1994 |
| JP | H8-70493 A | 3/1996 |
| JP | 08-307986 A | 11/1996 |
| JP | 2001268684 A | 9/2001 |
| JP | 2006-14307 A | 1/2006 |
| JP | 2008219713 A | 9/2008 |
| WO | 9325167 A1 | 12/1993 |
| WO | 9326085 A1 | 12/1993 |
| WO | 9802016 A2 | 1/1998 |
| WO | 9904597 A2 | 1/1999 |
| WO | 9957937 A1 | 11/1999 |
| WO | 2004064443 A3 | 4/2005 |
| WO | 2007016020 A1 | 2/2007 |
| WO | 2010126976 A2 | 11/2010 |
| WO | 2012012331 A1 | 1/2012 |

OTHER PUBLICATIONS

International Preliminary Report on Patentability dated Sep. 15, 2008 for PCT/US07/067496.
Chinese Office Action dated Mar. 13, 2009 in related CN Appl. No. 200510077928.0.
EP Search Report dated Aug. 7, 2006 from EP Appl. No. 05104712.4.
International Search Report and Written Opinion dated Apr. 25, 2008 from PCT/2007/067496.
EP Examination dated Feb. 9, 2010 for EP 05104712.4-1224.
CN Office Action dated Feb. 12, 2010 for CN Appl. No. 200510077928.0.
CN Office Action dated Sep. 3, 2010 for CN 200780014891.4.
JP OA dated Nov. 2, 2010 for JP2005-174271.
CN Office action dated Jan. 20, 2011 for CN Appln. No. 200510077928.0.
CN Office Action dated May 25, 2011 for CN Appln. 200510077928.0.
International Search Report and Writen Opinion dated Nov. 13, 2008, issued in International Application No. PCT/US2008/053698, filed Feb. 12, 2008.
International Preliminary Report on Patentability dated Aug. 27, 2009 for PCT/US2008/053698.
International Search Report and Written Opinion dated Jan. 22, 2013 issued in International Application No. PCT/US2012/065751, filed Nov. 19, 2012.
Japanese Unexamined Patent Application, Publication No. H8-70493, Publication date: Mar. 12, 1996.
International Search Report and Written Opinion dated Apr. 22, 2014 for International application No. PCT/US2013/060107.

* cited by examiner

POWER SUPPLY VOLTAGE-BASED HEADSET FUNCTION CONTROL

TECHNICAL FIELD

This disclosure relates to employing a selection of voltages between portions of a communications headset linked by cable to control the provision of various headset functions in a manner minimizing the quantity of and interference between conductors required within such cable.

BACKGROUND

In recent years, communications headsets have expanded in functionality from being two-way communications headsets meant only for use with an intercom system (ICS) or radio to also including the ability to accept (wirelessly or via conductive cabling) audio from an auxiliary audio source to (e.g., a tape player/recorder, solid-state music playing device, etc.), to provide active noise reduction (ANR) functionality, and to wirelessly link with cell phones for two-way communications with and through that cell phone. However, the addition of these newer functions frequently imposes a requirement for increasingly complex electrical signaling between at least two separately encased components of a communications headset that are often coupled by a cable.

As will be understood by those skilled in the art, common approaches to accommodating the need for such increasingly complex electrical signaling through such a cable often entails the introduction of some form of digital serial bus by which binary codes representing commands may be conveyed to control various functions and/or the provision of additional electrical conductors that are each associated with a separate one of the functions to be controlled. A drawback of the provision of a digital serial bus through such a cable is the resulting increase in complexity required of circuitry at each end of that cable to encode and decode the binary codes representing the various commands. In the case of a communications headset that serves to enable what may be critical communications (e.g., communications between a pilot and a control tower, or communications among crew members in a military vehicle), such an increase in complexity is usually deemed undesirable as it tends to increase opportunities for malfunctions to occur during occasions when malfunctions can be least afforded.

While the provision of additional conductors that each correspond to a separate function may avoid such encoding and decoding complexities, a drawback of the provision of additional electrical conductors through such a cable is that the cable becomes increasingly heavier, thicker and less flexible as each conductor is added. Whether such a cable couples separately encased components of a headset that are both worn on a user's person or such a cable couples a component of a headset that is worn on a user's person to a separately encased component that is itself coupled in some way to a portion of an interior of a vehicle, it is often desirable for that cable to be as light, thin and flexible as possible to avoid burdening a user with unnecessary weight and/or to avoid impeding a user's freedom of movement any more than necessary.

SUMMARY

Through a cable coupling two portions of a communications headset, conductors of the cable providing electric power from one of the portions to another are caused to do so with one of a selection of different predetermined voltage levels used to control aspects of one or more functions performed by the communications headset, including enabling or disabling functions, perhaps at least partially by controlling the manner in which the provided electric power is used.

In one aspect, a communications headset includes a head assembly, an audio circuit electrically coupled to at least the acoustic driver to perform at least one function of the communications headset, a control circuit, and a first cable having a first conductor and a second conductor electrically coupling the control circuit to the audio circuit to enable the control circuit to provide electric power to the audio circuit to perform the at least one function. The head assembly includes an earpiece having a casing and an acoustic driver disposed therein, and a first microphone positioned relative to the casing of the earpiece towards the vicinity of a mouth of a user of the communications headset. At least one portion of one of the audio circuit and the control circuit is disposed within a portion of the head assembly, and an aspect of the at least one function performed by the audio circuit is controlled by the control circuit providing the electric power to the audio circuit via the first and second conductors with a voltage level selected from a plurality of predetermined voltage levels. In another aspect, a method of controlling an aspect of at least one function performed by an audio circuit of a communications headset includes providing electrical power from a control circuit disposed within a first portion of the communications headset having access to electrical power to the audio circuit disposed within a second portion of the communications headset through at least a pair of conductors of a cable coupling the first and second portions of the headset with a voltage level selected from a plurality of predetermined voltage levels, wherein the selection of the voltage level serves as a control signal to the audio circuit to control the aspect of the at least one function.

The at least one function may be feedback-based ANR, feedforward-based ANR, talk-through, a diagnostic mode, and/or wireless communications with a wireless device. The aspect of the at least one function may be a gain setting and/or provision of power to a component of the audio circuit. The electric power provided by the control circuit to the audio circuit may be provided to the control circuit by a battery of the communications headset and/or a second cable coupled to the control circuit and having at least one connector enabling the second cable to be coupled to a communications device. The control circuit may monitor the electric power provided by the at least one of the battery and the communications device, and may select the voltage level from among the plurality of voltage levels in response to availability of electric power. The control circuit may select the voltage level from among the plurality of voltage levels in response to operation of a manually-operable control coupled to the control circuit.

DETAILED DESCRIPTION

What is disclosed and what is claimed herein is intended to be applicable to a wide variety of communications headsets, i.e., devices structured to be worn on or about a user's head in a manner in which at least one acoustic driver is positioned in the vicinity of an ear, and in which a microphone is positioned towards the user's mouth to enable two-way audio communications. It should be noted that although specific embodiments of communications headsets incorporating a pair of acoustic drivers (one for each of a user's ears) are presented with some degree of detail, such presentations of specific embodiments are intended to facilitate understanding through examples, and should not be taken as limiting either the scope of disclosure or the scope of claim coverage.

It is intended that what is disclosed and what is claimed herein is applicable to headsets that also provide active noise reduction (ANR), passive noise reduction (PNR), or a combination of both. It is intended that what is disclosed and what is claimed herein is applicable to headsets meant to be coupled to at least an intercom system (ICS) or radio through a wired connection, but which may be further structured to be connected to any number of additional devices through wired and/or wireless connections. It is intended that what is disclosed and what is claimed herein is applicable to headsets having physical configurations structured to be worn in the vicinity of either one or both ears of a user, including and not limited to, over-the-head headsets with either one or two earpieces, behind-the-neck headsets, two-piece headsets incorporating at least one earpiece and a physically separate microphone worn on or about the neck, as well as hats or helmets incorporating earpieces and a microphone to enable audio communication. Still other embodiments of headsets to which what is disclosed and what is claimed herein is applicable will be apparent to those skilled in the art.

Figure 1:
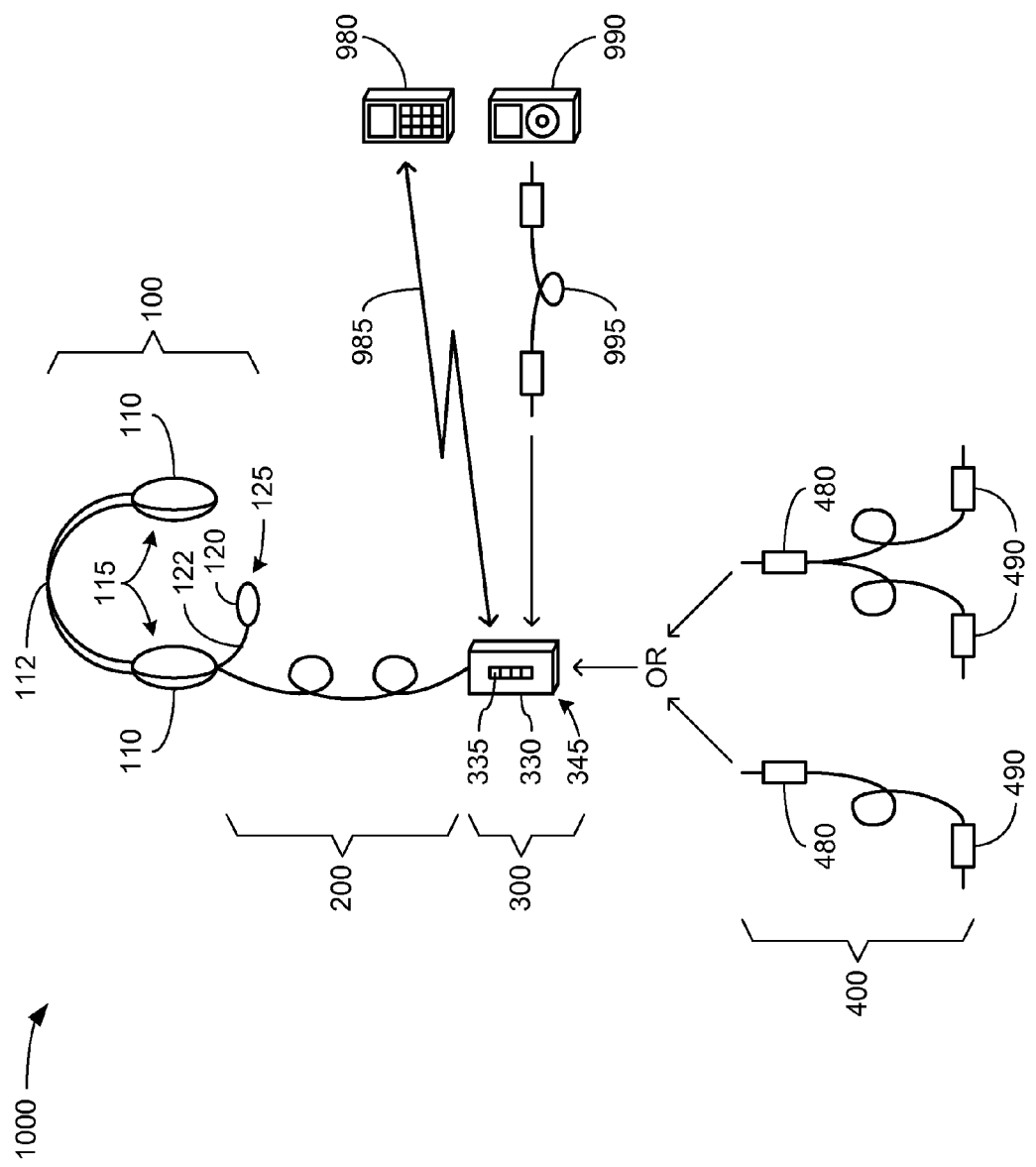
FIG. 1 is a perspective diagram of a communications headset.

FIG. 1 depicts an embodiment of a communications headset 1000 meant to be coupled to a communications device, such as an ICS or radio. The headset 1000 incorporates a head assembly 100, an upper cable 200, a control box 300, and a lower cable 400. The head assembly 100 incorporates a pair of earpieces 110 that each incorporate one of a pair of acoustic drivers 115, a headband 112 that couples together the earpieces 110, a microphone boom 122 extending from one of the earpieces 110, and a microphone casing 120 supported by the microphone boom 122 and incorporating a microphone 125. Further incorporated into the casing of at least one of the earpieces 110 and/or of another component of the head assembly 100 is an audio circuit 600 electrically coupled to the acoustic drivers 115 and/or the microphone 125. As depicted, the communications headset 1000 has an "over-the-head" physical configuration commonly found among communications headsets employed in airplanes, helicopters, military vehicles, etc. Depending on the size of each of the earpieces 110 relative to the typical size of the pinna of a human ear, each of the earpieces 110 may be either an "on-ear" (also commonly called "supra-aural") or an "around-ear" (also commonly called "circum-aural") form of earcup. However, despite the depiction in FIG. 1 of this particular physical configuration of the head assembly 100, those skilled in the art will readily recognize that the head assembly may take any of a variety of other physical configurations, including physical configurations having only one of the earpieces 110 (and correspondingly, only one of the acoustic drivers 115), physical configurations employing a napeband meant to extend between the earpieces 110 about the back of a user's neck, and/or physical configurations having no band at all.

The control box 300 incorporates a casing 330 that incorporates a control circuit 700. The control box 300 may also incorporate one or more manually-operable controls 335 enabling a user of the communications headset 1000 to manually control aspects of various functions performed by the communications headset 1000. The control box may further incorporate at least a compartment (not shown) for a battery 345 and/or the battery 345, itself, coupled to the control circuit 700.

The upper cable 200 is made up principally of a multiple-conductor electrical cable extending between and coupling one of the earpieces 110 of the head assembly 100 to the control box 300. In so doing, at least a subset of the conductors of the upper cable 200 couple and convey electrical signals (including electric power) between the audio circuit 600 of the head assembly 100 and the control circuit 700 of the control box 300. In various possible variants of the communications headset 1000, the upper cable 200 may be formed with a coiled shape as a convenience to users of the headset 1000. Also, in various possible variants of the communications headset 1000, the upper cable 200 may additionally incorporate one or more connectors (not shown) on the upper cable 200 where the upper cable 200 is coupled to one of the earpieces 110 and/or where the upper cable 200 is coupled to the casing 330 of the control box 300, thereby making the upper cable 200 detachable from one or both of the head assembly 100 and the control box 300.

The lower cable 400 is made up principally of another multiple-conductor electrical cable extending from the control box 300, different variants of which end with one or more connectors 490 (two variants being depicted) that are meant to enable the communications headset 1000 to be detachably coupled to any of a variety of communications devices (e.g., an ICS and/or radio). In so doing, at least a subset of the conductors of the lower cable 400 couple and convey electrical signals (including electric power) between the control circuit 700 of the control box 300 and circuitry of whatever communications device to which the connector(s) 490 may be coupled. Not unlike the upper cable 200, in various possible variants, the lower cable 400 may be formed with a coiled shape as a convenience to users of the headset 1000. Also, in various possible variants of the communications headset 1000 the lower cable 400 may additionally incorporate one or more connectors 480 where the lower cable 400 is coupled to a connector (not shown) of the control box 300, thereby making the lower cable 400 detachable from the control box 300.

As also depicted in FIG. 1, various variations of the communications headset 1000 are capable of performing various other functions beyond simply enabling its user to engage in two-way voice communications through whatever communications device that the communications headset 1000 is coupled to via the lower cable 400. The headset 1000 may incorporate a wireless transceiver enabling it to be coupled via wireless signals 985 (e.g., infrared signals, radio frequency signals, etc.) to a wireless device 980 (e.g., a cellphone, an audio playback/recording device, a two-way radio, etc.) to thereby enable a user of the headset 1000 to additionally interact with the wireless device 980 through the headset 1000. Alternatively or additionally, the headset 1000 may incorporate an auxiliary interface (e.g., some form of connector to at least receive analog or digital signals representing audio) enabling the headset 1000 to be coupled through some form of optically or electrically conductive cabling 995 to a wired device 990 (e.g., an audio playback device, an entertainment radio, etc.) to enable a user to at least listen through the headset 1000 to audio provided by the wired device 990.

Where the control box 300 incorporates the manually-operable controls 335, the manually-operable controls 335 may enable a user of the headset 1000 to coordinate the transfer of audio among the headset 1000, the wireless device 980, the wired device 990, and whatever communications device to which the headset 1000 may be coupled via the lower cable 400.

Figure 2:
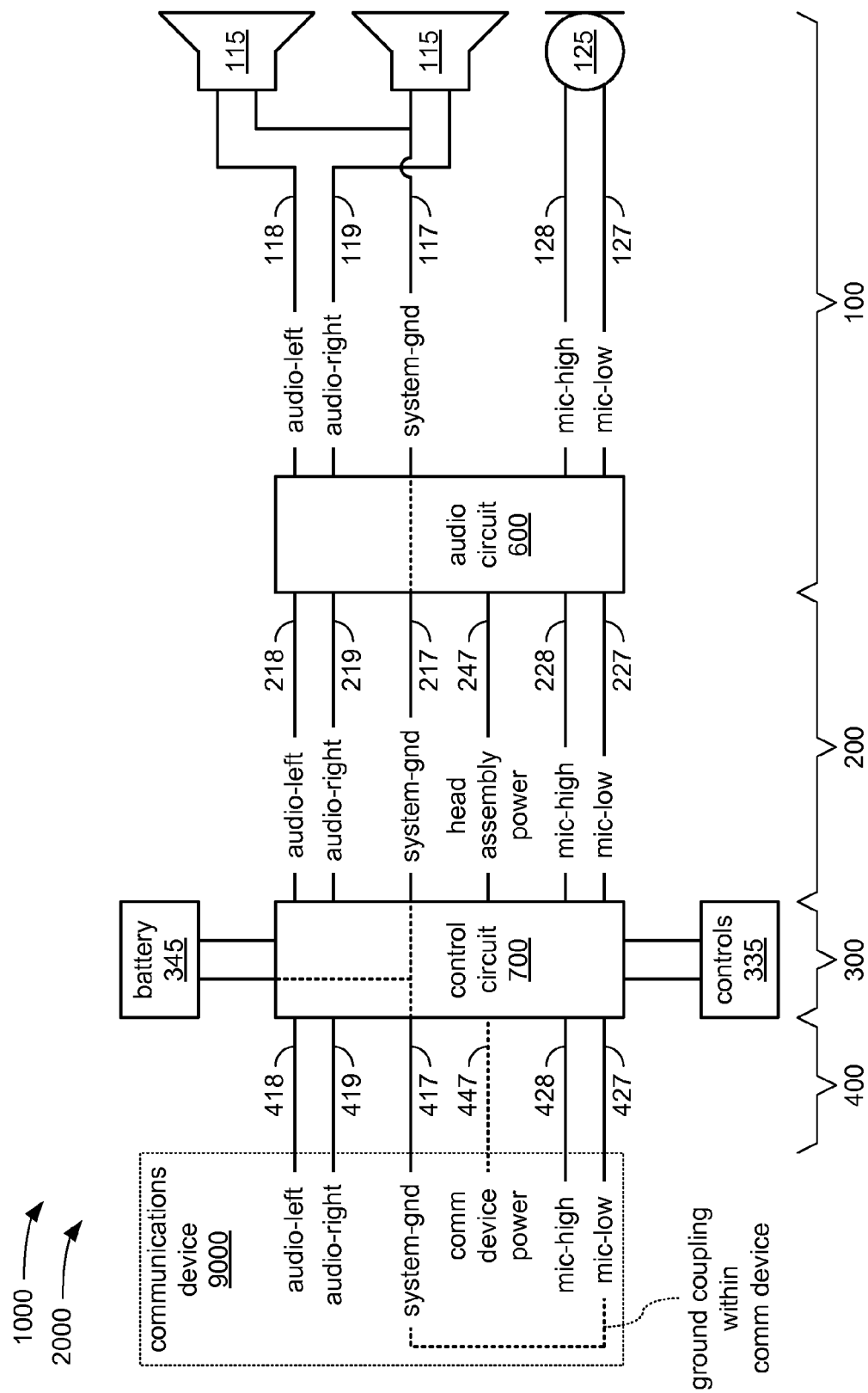
FIG. 2 is a block diagram of a possible electrical architecture of the communications headset of FIG. 1.

FIG. 2 depicts a possible embodiment of an electrical architecture 2000 that may be employed by the communications headset 1000. To facilitate understanding, the headset 1000 is depicted as being coupled to a communications device 9000 (e.g., an ICS or radio) with only portions of the communications device 9000 needed to facilitate discussion being depicted (in broken lines) for sake of visual clarity. Mirroring what was depicted in FIG. 1, FIG. 2 depicts the coupling of the head assembly 100 to the control box 300 via the upper cable 200, and depicts the coupling of the control box 300 to the communications device 9000 via the lower cable 400. However, FIG. 2 further depicts individual conductors of each of the cables 200 and 400.

It should again be noted that the audio circuit 600 may be carried entirely within the casing of only one of the earpieces 110; or may be divided into multiple portions, possibly with a portion within the casings of each of the earpieces 110 (in variants of the headset 1000 having a pair of the earpieces 110), and/or with a portion within the casing 120 that carries the microphone 125, and/or with one or more portions distributed elsewhere in the structure of the communications headset 1000. Thus, although FIG. 2 and subsequent figures depict the audio circuit 600 with a single block for sake of clarity, this should not be taken as an indication that the entirety of the audio circuit 600 is disposed at a single location of the structure of the headset 1000.

As depicted, in the electrical architecture 2000, audio-left and audio-right signals, along with an accompanying common system-gnd serving as a signal return, extend between the communications device 9000 and corresponding ones of the acoustic drivers 115 through conductors within the head assembly 100, conductors of the cables 200 and 400, and portions of the circuits 600 and 700. Specifically, one of the acoustic drivers 115 is coupled to the communications device 9000 through system-gnd conductors 117, 217 and 417; through audio-left conductors 118, 218 and 418; and through portions of the circuits 600 and 700 (as depicted with dotted lines). The other of the acoustic drivers 115 is coupled to the communications device 9000 through the same system-gnd conductors; through audio-right conductors 119, 219 and 419; and also through portions of the circuits 600 and 700. The provision of the separate audio-left and audio-right signals enables the provision of stereo audio to the ears of a user of the headset 1000.

As also depicted, mic-high and mic-low signals extend between the communications device 9000 and the microphone 125 also through conductors within the head assembly 100, conductors of the cables 200 and 400, and portions of the circuits 600 and 700. Specifically, the microphone 125 is coupled to the communications device 9000 through mic-low conductors 127, 227 and 427; through mic-high conductors 128, 228 and 428; and through portions of the circuits 600 and 700. As will be familiar to those skilled in the art, widespread industry practice and/or government regulations in specific industries often dictate that specific forms of communications device (e.g., a radio built into an airplane or armored military vehicle) provide a microphone bias voltage across the conductors associated with coupling a headset microphone to those forms of communications device to accommodate some types of microphones requiring a bias voltage.

As will be familiar to those skilled in the art, it is considered a best practice to maintain the conductors coupling a headset microphone to an ICS or radio (e.g., the conductors mic-low and mic-high depicted in FIG. 2) as entirely separate from the conductors coupling a headset acoustic driver to an ICS or radio (e.g., the conductors audio-left, audio-right and system-gnd depicted in FIG. 2). As part of such best practice, any coupling of any ground conductors among the conductors associated with that microphone and those associated with that acoustic driver occurs only within the ICS or radio (as depicted with a dotted line) in an effort to avoid the creation of a ground loop extending along the length of whatever cabling couples a headset to an ICS or radio.

Further, and with somewhat less consistency even within a given industry, various forms of communications device may or may not provide a communications headset with electric power via still another conductor coupling that communications device to that headset. Where such power is provided, it is usually referenced to whatever ground conductor is associated with an acoustic driver of that headset (e.g., the system-gnd conductor 417), and not one of the conductors associated with a microphone of that headset. As depicted and discussed in reference to FIG. 1, the lower cable 400 may be detachable from the control box 300 of the communications headset 1000 to allow different versions of the lower cable 400 having different versions of the connector(s) 490 to be used in order to accommodate different forms of a communications device. As will be familiar to those skilled in the art, the different versions of mating connectors with which the communications device 9000 is provided may or may not support the provision of electric power to a headset, and thus, this is among the differences that may be accommodated with different versions of the lower cable 400. It is for this reason that the communications device power conductor 447 is shown as a dotted line, since it may or may not be present depending on the version of the lower cable 400 that is used. As will also be familiar to those skilled in the art, even where the communications device 9000 does provide electric power and the version of the lower cable 400 used supports conveying that electric power to the control box 300, such provision of electric power by the communications device 9000 to the headset 1000 does not occur at times when the lower cable 400 has not been coupled by a user to a mating connecting of the communications device 9000. It is for this reason that the communications device 9000 is also depicted with dotted lines.

Thus, as depicted, the control circuit 700 is provided with power, possibly from one or both of communications device 9000 via the communications device power conductor 447 and the battery 345, or possibly solely from the battery 345. In keeping with other best practices, a ground conductor of the battery 345 is typically coupled to the common system-gnd (as depicted with a dotted line). As will be explained in greater detail, the communications headset 1000 may use electric power in performing various functions including, and not limited to, amplifying audio that is acoustically output by the acoustic drivers 115, pre-amplifying audio detected by the microphone 125, providing one or more forms of ANR, powering a wireless transceiver to send and/or receive audio (e.g., whatever wireless transceiver may be used to form the communications link 985), performing any of a variety of forms of signal processing on audio acoustically output by the acoustic drivers 115 and/or detected by the microphone 125, and/or providing a talk-through (TT) function enabling selective passage of speech sounds from the environment external to the casings 110 through whatever passive noise reduction (PNR) and/or ANR that may be provided by the communications headset 1000 so as to reach the ears of a user.

As will also be explained in greater detail, one or more conductors of the upper cable 200 convey power provided to the control circuit 700 from whatever source (i.e., at the location of the control box 300) to the audio circuit 600 (i.e., to the location of the head assembly 100). More specifically, and again referring to the electrical architecture 2000 depicted in FIG. 2, at least a head assembly power conductor 247 is employed to convey power of varying voltage level from the control circuit 700 to the audio control 600. In recognition of the generally accepted practice of maintaining the mic-high and mic-low signals as being as separate from other signals as possible, in the electrical architecture 2000, the system-gnd conductor 217 is employed as the return path for the current flow of the electrical power provided via the head assembly power conductor 247. The varying voltage is employed to control the one or more possible functions performed by the audio circuit 600 without requiring one more distinct control signal conductors being added to the upper cable 200 and/or requiring either of the circuits 600 or 700 being made more complex to add the capability encode and decode serially-transmitted command signals. In other words, the head assembly power conductor 247, which might otherwise have been employed to do nothing more than to convey electric power, is also employed as a control signal conductor. And as will become apparent, the added complexity to the circuits 600 and 700 that is required to support this control signaling mechanism is quite minimal, requiring no form of processing device or memory device to store a sequence of instructions. As will be explained in greater detail, what the audio circuit 600 is signaled to do in performing one or more functions may be determined by a user through their operation of the manually-operable controls 335 and/or may be determined in a more automated manner in response to available electric power.

Removing the need to add one or more signal conductors to the upper cable 200 through such dual use of one or more conductors that would otherwise only convey electric power yields a number of advantages. With fewer conductors, the upper cable 200 can be made lighter, resulting in less "tugging" on one of the earpieces 110 being felt by a user of the communications headset 1000, which can be uncomfortable and/or distracting, as well as potentially causing one of the earpieces 110 to be more likely to become dislodged from its proper location relative to one of the user's ears. Both ease and cost of manufacturing are able to be improved. As those skilled in the art will readily recognize, having fewer conductors within the upper cable 200 makes fabrication, especially where the upper cable 200 is to be formed with a coiled shape, much easier. Also, the lesser quantity of conductors results in a lesser overall materials cost. Further, as those skilled in the art will readily recognize, each conductor conveying a signal (other than at least DC power) added to a multi-conductor cable adds another possible "antenna-like" emitter and/or receiver of electromagnetic interference (EMI), as such signals are typically driven onto conductors and received from such conductors using components that present a relatively high impedance to a ground. In contrast, conductors conveying DC electric power tend to be driven by power supply components that present what is essentially an AC-coupled short to a ground, thereby minimizing EMI-induced signals.

Further, this use of voltage levels as a control signaling mechanism yields advantages. Were digital serial signaling used to convey commands, each conveyance of any command would be effected by the use of a number of signal transitions (e.g., high-to-low and low-to-high voltage level transitions, or forward-to-reverse and reverse-to-forward current flow transitions) being made on a signal conductor to convey the binary 0's and 1's representing each command (possibly including parity bits, checksum bits, start bits, stop bits and/or other protocol features) which could generate EMI inducing stray signals on one or more of the other adjacent conductors. Depending on the complexity of the protocol, there may be still more of such EMI caused by a recurring clock signal. By contrast, the provision of DC voltage levels that make only a single transition (from one voltage level to another) to convey a change in functions enabled and/or a selection of a setting on a relatively infrequent basis greatly reduces instances in which interference may be induced on one or more other conductors.

Still further, as will be familiar to those skilled in the art, especially including the use of communications headsets in aviation, government regulations often require that a degree of "failsafe" design be employed in communications headsets such that the basic functionality required in a communications headset for it to be used with a communications device in carrying out two-way communications not be lost as a result of a loss of power to the communications headset. Thus, the acoustic drivers 115 and the microphone 125 must still be operational even if no power is provided by the communications device 9000, by the battery 345, or by any other source. For this reason, it is common practice to provide such features in the audio circuit 600 as a mechanism for signals employed in the operation of the acoustic drivers 115 and the microphone 125 to bypass any amplification or other circuitry when such power loss occurs. It is also for this reason that the complexities added through the inclusion of any form of processing device or memory device to support the performance of one or more functions via execution of a sequence of instructions is generally not deemed desirable. There is a pervasively held principle of design in communications headsets (especially for such applications as aviation) that "simpler is better" in all aspects of design.

Figure 3:
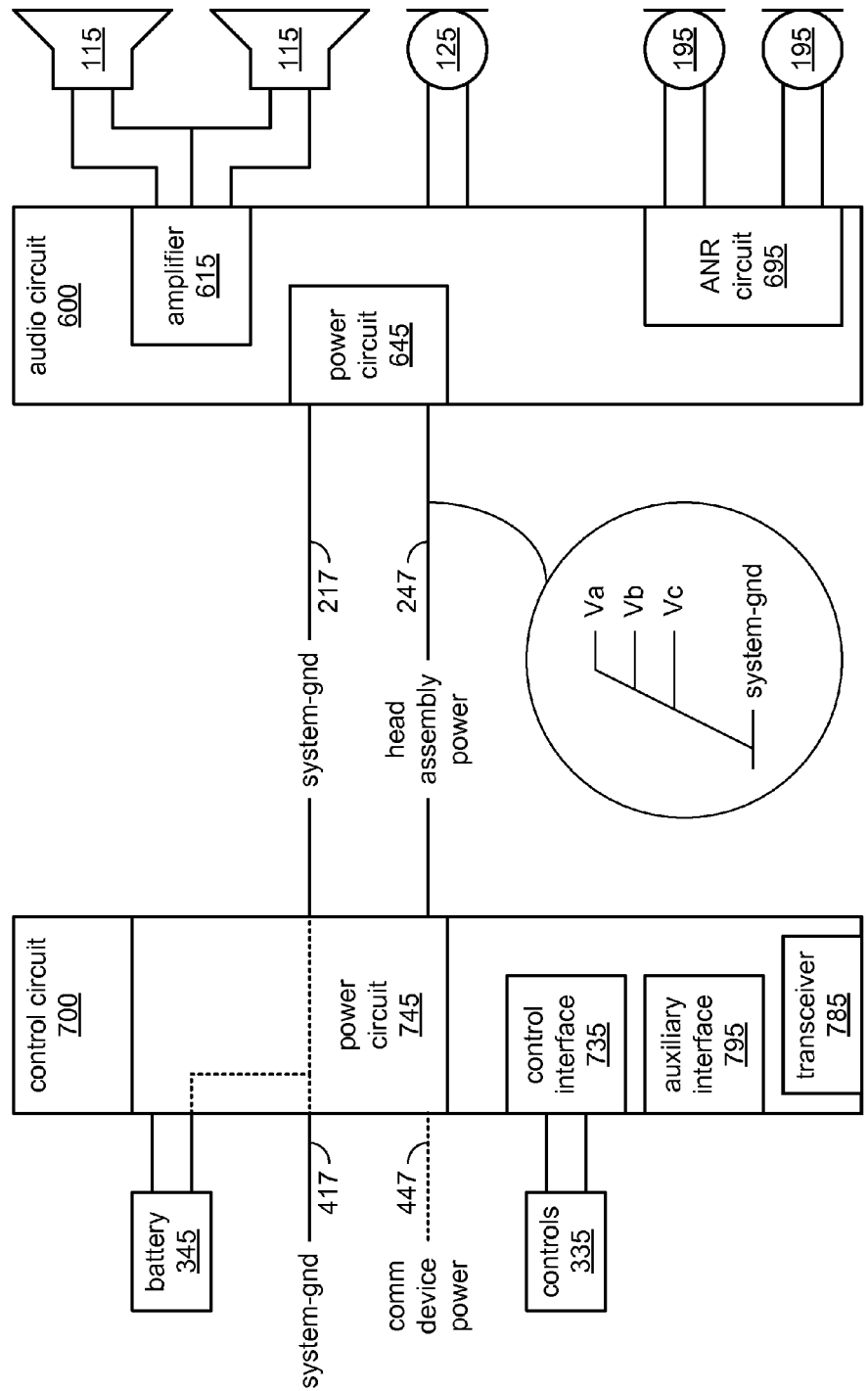
FIG. 3 is a block diagram of portions of the electrical architecture of FIG. 2 related to providing electric power between portions of the communications headset of FIG. 1.

FIG. 3 depicts portions of a variant of the electrical architecture 2000 introduced in FIG. 2 germane to discussing the provision of electric power and use of its voltage level as a control signaling mechanism. Thus, portions more germane to discussing the conveyance of audio signals among components of the communications headset 1000 have been omitted for sake of clarity.

As depicted, the control circuit 700 in this variant of the electrical architecture 2000 incorporates one or more of a control interface 735 by which the control circuit 700 is coupled to the user-operable controls 335, a transceiver 785 enabling the communications headset 1000 to form the wireless link 985 with the wireless device 980, and an auxiliary interface 795 enabling the communications headset 1000 to be coupled to the wired device 990. The control circuit 700 also incorporates a power circuit 745 to receive electric power from the communications device 9000 (where a variant of the lower cable 400 that is in use and the communications device 9000 both support such provision of power, as previously discussed) and from the battery 345, and to control the use of that electric power by other components of the communications headset 1000.

As depicted, the audio circuit 600 in this variant of the electrical architecture 2000 incorporates one or more of an amplifier 615 to amplify audio signals with which the acoustic drivers 115 are driven to acoustically output audio, and an ANR circuit 695 by which the audio circuit 600 is coupled to one or more ANR microphones 195 to generate anti-noise sounds for acoustic output by the acoustic driver 115 (along with audio associated with communications) to provide ANR. The audio circuit 600 also incorporates a power circuit 645 coupled through at least the system-gnd conductor 217 and the head assembly power conductor 247 to the power circuit 745 of the control circuit 700, and cooperating with the power circuit 745 to control use of electric power by other components of the communications headset 1000 and/or control one or more settings.

The cooperation between the power circuits 645 and 745 in controlling use of electric power by other components of the communications headset 1000 and/or one or more settings is at least partially effected through the selective provision of electric power by the power circuit 745 to the power circuit 645 with a selectable voltage level through at least the head assembly power conductor 247, with the system-gnd conductor 217 acting as the current flow return path. With the system-gnd conductor 217 acting as that return path, the voltage level detected by the power circuit 645 on the head assembly power conductor 247 is referenced to the system-gnd conductor 217, and this is why the visual inset provided in FIG. 3 (within a circular bubble) depicts various voltage levels (i.e., Va, Vb and Vc) with reference to the ground voltage level on the system-gnd conductor 217 at the location of the power circuit 645. It should be noted that although all of the voltage levels Va, Vb and Vc provided on the head assembly power conductor 247 are depicted as higher than the ground voltage level of the system-gnd conductor 217, other embodiments are possible in which some or all of the voltage levels that may be provided on the head assembly power conductor 247 may be lower than the ground voltage level. It should also be noted that although a quantity of three voltage levels Va, Vb and Vc (in addition to the ground voltage level of the system-gnd conductor 217) are depicted, other embodiments are possible in which a lesser or greater quantity of voltage levels may be used.

Further, although the voltage levels on the head assembly power conductor 247 are depicted and discussed herein as being referenced to the system-gnd conductor 217, which has a contracted form of the word "ground" in its name, and although it is contemplated that the system-gnd conductor 217 is indeed meant to be coupled to a ground of the communications device 9000, those skilled in the art will readily recognize that the "ground voltage level" present on the system-gnd conductor 217 may differ from other ground voltage levels present on other ground conductors present within the communications headset 1000 and/or provided by the communications device 9000. For example, it may be that the ground voltage level present on the system-gnd conductor 217 may, in fact, be a positive or negative voltage level relative to the system-gnd conductor 417 that is driven onto the system-gnd conductor 217 by a power source within the control box 300 or elsewhere within the communications headset 1000. Such a positive or negative voltage may be placed on the system-gnd conductor 217, for example, to support operation of the amplifier 615. Also for example, and as those skilled in the art will readily recognize, it is not uncommon for a ground voltage level to change or "drift" to some degree between opposite ends of a relatively lengthy cable.

Indeed, as a result of the possibility of voltage levels drifting somewhat between the circuits 600 and 700, largely as a result of the lengths of the system-gnd conductor 217 and the head assembly power conductor 247, those skilled in the art will readily recognize that detection of each of the voltages levels Va, Vb and Vc, as well as a ground voltage level, on the head assembly power conductor 247 relative to the system-gnd conductor 217 is likely best accomplished by defining voltage ranges that correspond to each of these voltage levels, and monitoring the head assembly power conductor 247 for a voltage level that falls within one of those ranges relative to the system-gnd conductor 217. Therefore, although the text of the present application discusses detecting the voltage levels Va, Vb and Vc, as well as a ground voltage level on the head assembly power conductor 247 relative to the system-gnd conductor 217, in actual implementation, voltage ranges allowing for some amount of deviation from each of these expected voltage levels are defined and the head assembly power conductor 247 is monitored for a voltage level falling within one of these voltage ranges relative to the system-gnd conductor 217. Thus, for example, the voltage level Va is deemed to have been detected if a voltage level is detected that falls within a predefined range of voltages that includes the expected voltage level Va. And thus, also for example, a ground voltage level is detected on the head assembly power conductor 247 if a voltage level is detected that falls within a predefined range of voltages that includes the ground voltage level present on the system-gnd conductor 217.

Each of the voltage levels Va, Vb and Vc, as well as the ground voltage level of the system-gnd conductor, are assigned a meaning such that the power circuit 645 takes specific actions in response to being provided with each of these voltage levels by the power circuit 745. In one possible example, these different voltage levels provide indications to the power circuit 645 of different ones and/or combinations of the amplifier 615 and the ANR circuit 695 to either be provided with electric power, or not. More specifically, in response to detecting a ground voltage level on the head assembly power conductor 247, the power circuit 645 provides no electric power to either of the amplifier 615 or the ANR circuit 695; in response to detecting voltage level Vc, the power circuit 645 provides electric power to the amplifier 615, but not the ANR circuit 695; in response to detecting voltage level Vb, the power circuit 645 provides electric power to the ANR circuit 695, but not to the amplifier 615; and in response to detecting voltage level Va, the power circuit 645 provides electric power to both the amplifier 615 and the ANR circuit 695. It is in this way that the head assembly power conductor 247 is caused to serve the dual functions of conveying electric power for use by components within the head assembly 100 and conveying an indication of what components within the head assembly 100 are to be provided with electric power and/or otherwise enabled. In other words, the head assembly power conductor 247 is caused to serve as both a power conductor and a control signal conductor.

It should be noted that although a ground voltage level on the system-gnd conductor 217 is given a meaning such that the power circuit 645 provides no electric power to other components within the head assembly 100 in this example, one of the other voltage levels Va, Vb or Vc could have been given this meaning in an alternate example such that the power circuit 645 responds in this manner and the ground voltage level could have been given a meaning that includes causing the power circuit 645 to provide electric power to one or more components, instead of none. However, as those skilled in the art will readily recognize, this would necessitate the power circuit 645 being provided with electric power in some other way than through the head assembly power conductor 247 so that the power circuit 645 is able to respond to detecting a ground voltage level by providing power to those one or more components. Such other way may very well require the addition of another conductor to the upper cable 200. Thus, giving the ground voltage level a meaning such that the power circuit 645 provides no electric power to other components is inherently simpler such that it may well be deemed desirable, since the provision of a ground voltage level on the head assembly power conductor 247 results in little or no voltage differential being present across the conductors 217 and 247, causing the power circuit 645 to be provided with substantially no electric power. It follows that where the power circuit 645, itself, is provided with no power, it would then be rendered incapable of directly providing electric power to another component of the head assembly 100, and thus, giving the ground voltage level a meaning of no electric power being provided to other components could very well simplify the internal electrical architecture of the power circuit 645.

It should also be noted that as an alternative to actually driving the head assembly power conductor 247 with a voltage level that is substantially similar to the ground voltage level present on the system-gnd conductor 217 (perhaps by the power circuit 745 coupling the head assembly power conductor 247 to the system-gnd conductor 217), the power circuit 745 could simply entirely disconnect the head assembly power conductor 247 such that no voltage level is driven onto that conductor. This would effectively achieve the same result as driving that conductor with a ground level voltage inasmuch as there would be no provision of power via that conductor to the power circuit 645. As those skilled in the art will readily understand, simply disconnecting the head assembly power conductor 247, rather than driving both it and the system-gnd conductor 217 with the ground voltage level may aid in avoiding the creation of a ground loop.

As hinted by the spacing between the depicted voltage levels, the difference between the ground voltage level and the closest of the other voltage levels (i.e., Vc) is greater than the differences between other adjacent voltage levels. It is not strictly necessary that this pattern in differences between adjacent voltage levels be followed. This pattern is derived from the current state of semiconductor technology in which many electronic devices require a power supply voltage no less than a level typically between 1.5V and 5.0V, with semiconductor technologies requiring less than a 2.0V power supply voltage becoming commonplace in the industry. As will be explained in greater detail, once a power supply voltage level of perhaps between 2.0V and 3.0V is provided, the other voltage levels can differ from that power supply voltage level by relatively small increments of 0.2V (possibly less) that are still enough to be easily distinguishable with comparator devices.

It should further be noted that although in this example each of the voltage levels that may be provided on the head assembly power conductor 247 by the power circuit 745 has been given a power-related meaning, one or more of these voltage levels may be given a meaning unrelated to the provision of power. For example, different ones of the voltage levels Va, Vb and/or Vc may be given meaning(s) such that a gain setting employed by one or both of the amplifier 615 or the ANR circuit 695 may be altered. Or for example, different ones of the voltage levels Va, Vb and/or Vc may be given meaning(s) such that the microphone 125 may be muted and/or the assignment of left and right audio channels to different ones of the acoustic drivers 115 may be changed to mix them into a single monaural audio channel and/or to swap them. Or as a further example, different ones of these voltage levels may be given meanings to choose different equalization settings, to choose between the use of an electret or a dynamic microphone, to enable or disable a talk-through feature, to change gain levels of some form of ANR, and/or to place at least a portion of the headset 1000 in a diagnostics mode.

By way of more specific example, one or more of these voltage levels may be employed to signal the ANR circuit 695 to provide only one or the other of feedback-based or feedforward-based forms of ANR, where the ANR circuit 695 is capable of providing either or both. As those familiar with ANR will readily recognize, both forms of ANR entail detecting unwanted noise sounds with one or more microphones, deriving anti-noise sounds and then acoustically outputting those anti-noise sounds at a location and with a timing selected to cause destructive acoustic interference with the unwanted noise sounds to at least reduce their acoustic amplitude. In embodiments in which the communications headset 1000 incorporates feedforward-based ANR, one or more microphones (e.g., the microphones 195) are carried by portions of the headset 1000 (preferably, the casings of the earpieces 110) such that they are acoustically coupled to the environment external to the acoustic volumes enclosed by the earpieces 110 in the vicinity of each ear in order to detect unwanted noise sounds in that external environment. In embodiments in which the communications headset 1000 incorporates feedback-based ANR, one or more microphones (e.g., the microphones 195) are carried within the acoustic volumes enclosed by the earpieces 110 in the vicinity of each ear in order to detect unwanted noise sounds from that external environment that have entered into the enclosed acoustic volumes. With either form of ANR, the ANR circuit 695 receives electrical signals representing the unwanted noise sounds from those microphones, and employs those noise sounds as reference sounds from which to generate the anti-noise sounds, which are then provided to the amplifier 615 to drive the acoustic drivers 115 to acoustically output the anti-noise sounds. As those skilled in the details of ANR will readily recognize, the coexistence of the microphones within the enclosed acoustic volumes and the acoustic drivers 115 creates a partially electrical and partially acoustic feedback loop—hence the term feedback-based ANR. In contrast, the acoustic coupling of microphones to the external environment in support of creating anti-noise sounds for acoustic output by the acoustic drivers 115 within the enclosed acoustic volumes does not form a feedback loop.

The ANR circuit 695 may be designed in such a manner as to combine common elements needed to implement both feedback-based and feedforward-based ANR to avoid duplication. Thus, where it is desired to provide only feedback-based ANR, and not feedforward-based ANR (perhaps in a situation in which noise sounds in the external environment are simply too loud to enable microphones that are acoustically coupled to that environment to continue to be linear in their acoustic-to-electrical conversion), the ANR circuit 695 may respond to a voltage level indicating this choice by removing microphone bias voltage(s) from those external microphones and/or from whatever pre-amplifier may be associated with those microphones Similarly, where it is desired to provide only feedforward-based ANR, and not feedback-based ANR (perhaps in a situation in which the provision of feedback-based ANR has become unstable, resulting in the generation of a "squeal" sound or other acoustic artifact), the ANR circuit 695 may respond to a voltage level indicating this choice by removing microphone bias voltage(s) from those microphones within the enclosed acoustic volumes and/or from whatever pre-amplifier may be associated with those microphones.

In various possible variations of the electrical architecture 2000, the power circuit 745 may be caused to provide a particular one of the voltage levels Va-Vc or the ground voltage level on the head assembly power conductor 247 in response to one or both of operation of the manually-operable control(s) 335 or a detected change in available electric power. For example, the manually-operable control(s) 335 may include one or more rocker switches, pushbutton switches, lever switches, slide switches and/or rotary switches that enable a user of the communications headset 1000 to choose whether they desire to have amplification of audio acoustically output by the acoustic driver 115 (i.e., whether they desire to make use of the amplifier 615), or desire to have ANR to block out unwanted environmental sounds (i.e., whether they desire to make use of the ANR circuit 695), or desire to have both. Indications of manual operation of the manually-operable control(s) 335 are detected by the control interface 735, and indications of such manual operation are relayed to the power circuit 745, causing the power circuit 745 to provide an appropriate voltage level on the head assembly power conductor 247 to direct the actions of the power circuit 645.

Alternatively or additionally, the power circuit 745 may monitor whatever electrical power is available from one or both of the battery 345 and the communications device 9000 (through an appropriate version of the lower cable 400), and may respond to detected shortfalls in available electric power by driving particular voltage levels onto the head assembly power conductor 247 to cause the power circuit 645 to either provide electric power to or disconnect electrical power from one or both of the amplifier 615 and the ANR circuit 695 as appropriate. More precisely, the power circuit 745 may provide a first voltage level to the power circuit 645 signaling the power circuit 645 to provide electric power to both of the amplifier 615 and the ANR circuit 695 in response to there being electrical power provided by the communications device 9000; may provide a second voltage level to the power circuit 645 signaling the power circuit 645 to provide electrical power to only one of the amplifier 615 or the ANR circuit 695; and may provide a third voltage level to the power circuit 645 signaling the power circuit 645 to provide no power to either of the amplifier 615 or the ANR circuit 695 (with the third voltage level possibly being the ground voltage level or a complete absence of the driving of any voltage level onto the head assembly power conductor 247).

Figure 4:
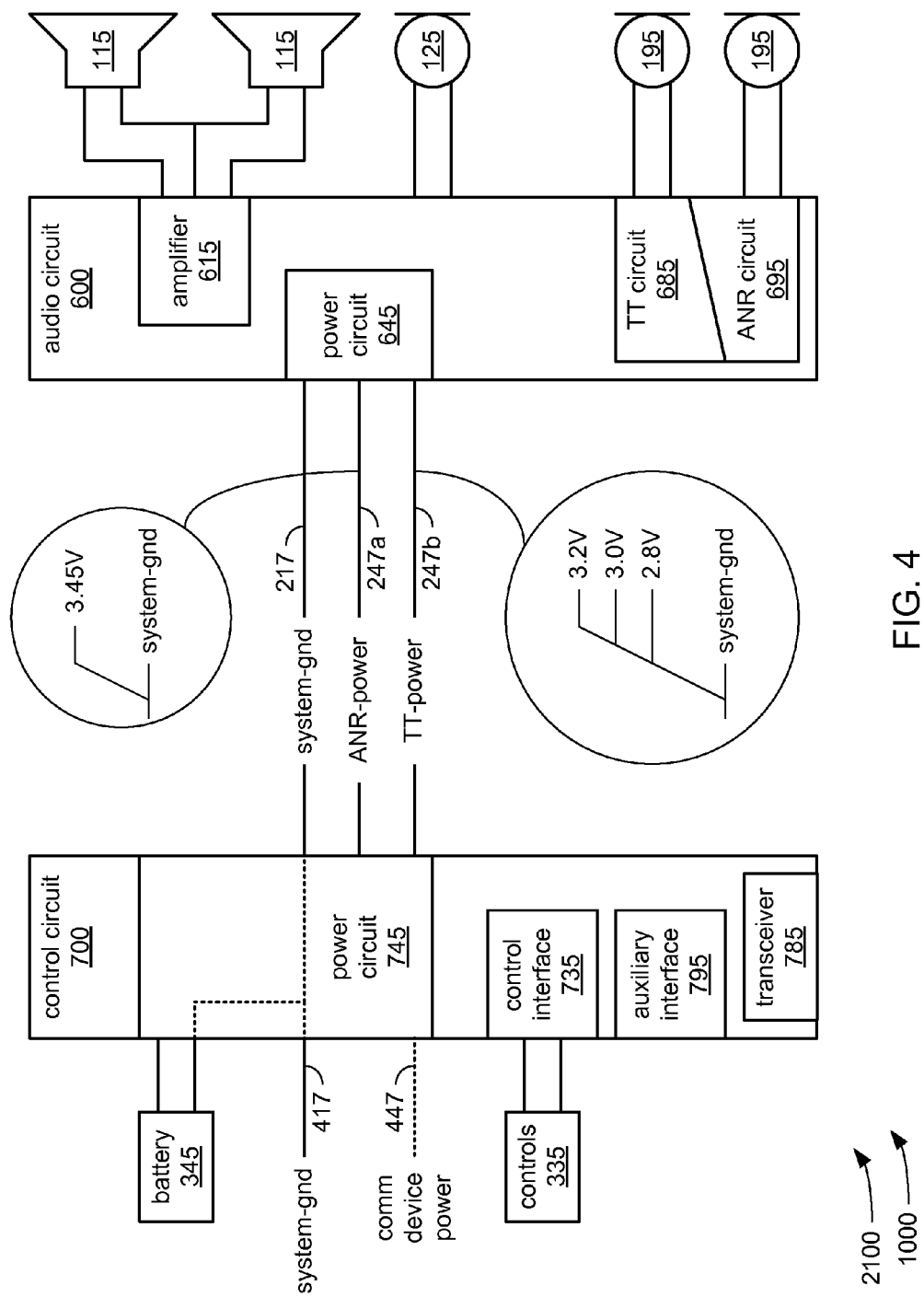
FIG. 4 is a block diagram of portions of another possible electrical architecture.

FIG. 4 depicts portions (similar to what portions were selected to be depicted in FIG. 3) of another possible embodiment of an electrical architecture 2100 that may be employed by the communications headset 1000. Thus, similar to FIG. 3, portions more germane to discussing the provision of electric power and use of its voltage as a control signaling mechanism are depicted, while portions more germane to discussing the conveyance of audio signals among components of the communications headset 1000 have been omitted for sake of clarity.

The electrical architectures 2100 and 2200 are substantially similar, and therefore, a fuller depiction of more of the electrical architecture 2100 similar to FIG. 2 is deemed unnecessary. However, one significant difference between these electrical architectures is the use of a pair of conductors, namely an ANR-power conductor 247a and a TT-power conductor 247b, in the electrical architecture 2100 in place of the single conductor 247 in the electrical architecture 2000. Another significant difference between these electrical architectures is the addition of a talk-through circuit (TT circuit) 685 that may cooperate with and/or be combined with the ANR circuit 695 at least in sharing use of ones of the microphones 195 acoustically coupled to the external environment to provide TT functionality alongside feedforward-based ANR functionality. Alternatively, the TT circuit 685 may be coupled to separate microphones (not shown) that are in no way shared with the ANR circuit 695, especially where the ANR circuit 695 supports only feedback-based ANR.

The ANR-power conductor 247a is employed by the power circuit 745 to enable cooperation with the power circuit 645 by providing electric power to the ANR circuit 695 through that conductor at selected voltage levels relative to the system-gnd conductor 217. As indicated by the visual inset associated with the ANR-power conductor 247a, the power circuit 745 may provide either a 3.45V DC voltage level or ground voltage level on that conductor. Upon receipt of the 3.45V DC voltage level, the power circuit 645 provides electric power to the ANR circuit 695, and upon receipt of the ground voltage level, the power circuit 645 ceases providing power to the ANR circuit 695.

The TT-power conductor 247b is employed by the power circuit 745 to enable cooperation with the power circuit 645 by providing electric power to the TT circuit 685 through that conductor at selected voltage levels relative to the system-gnd conductor 217. As indicated by the visual inset associated with the TT-power conductor 247b, the power circuit may provide any one of a ground, a 2.8V DC, a 3.0V DC or a 3.2V DC voltage level on that conductor. Upon receipt of any of the 2.8V to 3.2V DC voltage levels, the power circuit 645 provides electric power to the TT circuit 685, and upon receipt of the ground voltage level, the power circuit 645 ceases providing electric power to the TT circuit 685. Further, upon receipt of the 2.8V DC voltage level, the TT circuit 685 gain is set to 0 dB; upon receipt of the 3.0V DC voltage level, the TT circuit 685 gain is set to 5 dB; and upon receipt of the 3.2V DC voltage level, the TT circuit 685 gain is set to 10 dB. In some variations, the power circuit 645 signals the TT circuit 685 concerning what gain to set for use in providing TT (talk-through) functionality, and in alternate variations, the power circuit 645 passes on the voltage level received via the TT-power conductor 247b to enable the TT circuit 685 to determine what gain to set. Thus, the TT-power conductor 247b serves dual roles, conveying power to the power circuit 645 for the provision of power to at least the TT circuit 685, and conveying control signals controlling an aspect of a function of the headset 1000 unrelated to the provision of electric power.

Depending on whether or not the audio circuit 600 incorporates other components requiring electric power (e.g., the amplifier 615, as depicted), the power circuit 645 may incorporate a power multiplexer (not shown) or other similar circuitry to enable power from either of the conductors 247a or 247b to be provided to those other components. Thus, those other components are provided with electric power regardless of which of the conductors 247a or 247b convey it, and thus, a separate power conductor for those other components need not be added to the upper cable 200.

Like feedforward-based ANR, TT (talk-through) functionality provided by a headset requires the placement of one or more microphones on some external portion of that headset. However, TT functionality entails detecting speech sounds occurring within the environment external to that headset with those microphones to enable those sounds to be conveyed into the acoustic volume enclosed by the combination of a casing and an ear canal. TT functionality is essentially allowing speech sounds to pass through whatever ANR and/or PNR (passive noise reduction) may be provided by electronic and/or structural components of a headset that otherwise serve to at least reduce the sounds in the external environment (including noise and speech) that are allowed to reach an ear. Combining ANR, PNR and TT functionality is meant to reduce environmental noise sounds that reach an ear, while still allowing speech sounds of a nearby person to do so.

Figure 5:
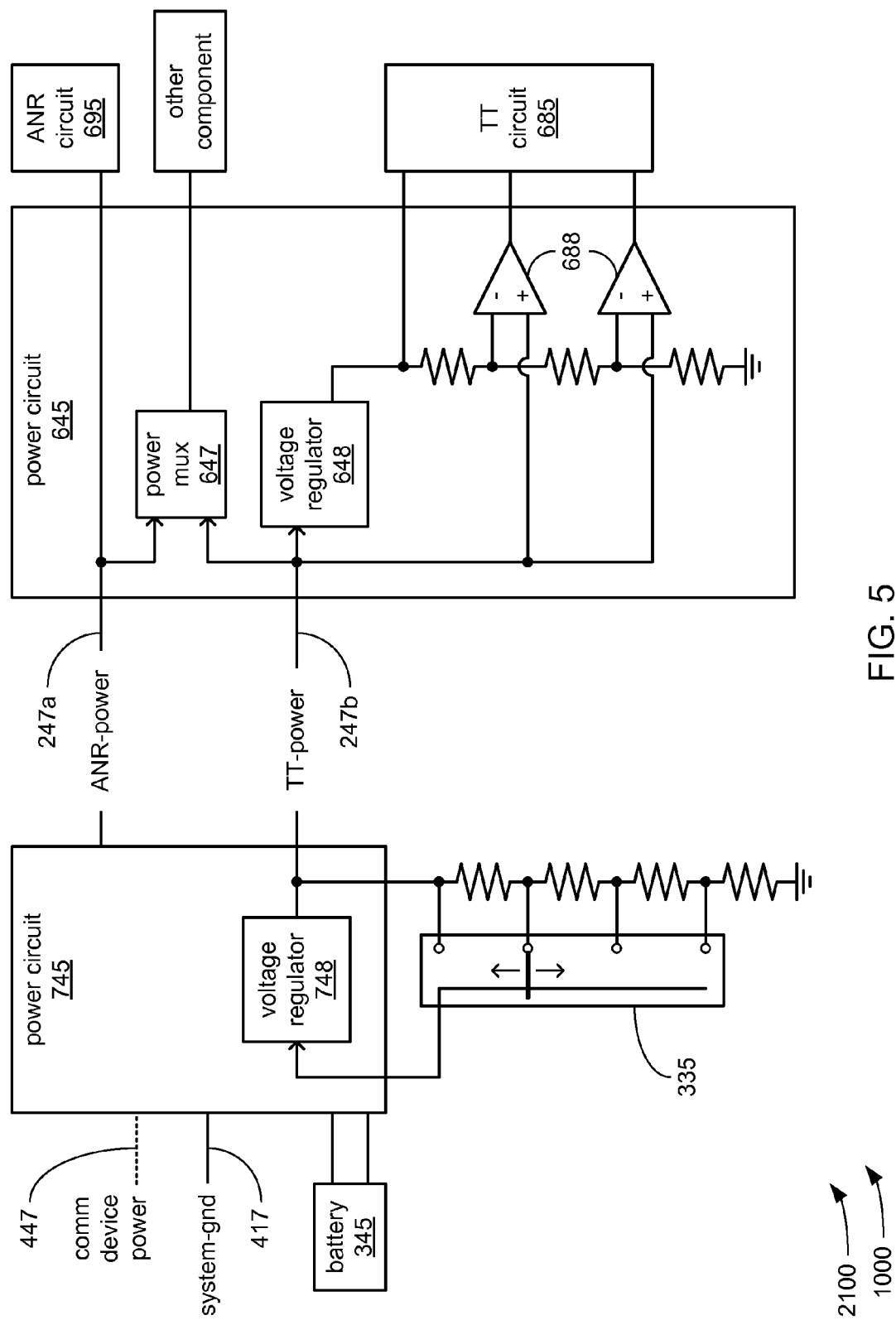
FIG. 5 is a block diagram of possible subparts of the portions of FIG. 4.

FIG. 5 depicts possible implementation details of subparts of the portions of the electrical architecture 2100 depicted in FIG. 4, most especially internal elements of the power circuits 645 and 745 of the electrical architecture 2100.

As depicted, the power circuit 745 incorporates a voltage regulator 748, of which an output and a feedback input are coupled to a resistor network and a four-position slide switch variant (or other variant) of one of the manually-operable controls 335. By operation of this manually-operable control 335, a user of the communications headset 1000 is able to change the voltage level of the output of the voltage regulator 748, which is coupled to the TT-power conductor 247b. Thus, with this manually-operable control 335, a user is able to directly select which one of the possible voltage levels discussed in reference to FIG. 4 will be driven onto the TT-power conductor 247b.

As depicted, the power circuit 645 incorporates a power multiplexer 647 receiving whatever electric power is provided through each of the conductors 247a and 247b by the power circuit 745, and selecting electric power to provide to one or more other components within the head assembly 100 from whichever one of these two conductors is conveying electric power with the highest voltage. The power circuit 645 also incorporates a voltage regulator 648 coupled to the TT circuit 685, which is coupled to and cooperates with both a resistor network and a pair of comparators 688 to decode the meaning of whatever voltage level is placed on the TT-power conductor 247b by the voltage regulator 748 under the control of the four-position slide switch variant of one of the manually-operable controls 335. The voltage regulator 648 receives electric power from the TT-power conductor 247b and outputs electric power to both the TT circuit 685 and a portion of that resistor network at a predetermined voltage level. The comparators 688 perform comparisons of whatever voltage is present on the TT-power conductor 247b to divided versions of the voltage level output by the voltage regulator 648 from that resistor network. The comparators 688 cooperate to distinguish the 2.8V, 3.0V and 3.2V DC voltage levels and convey the results of their comparisons to the TT circuit 685 to provide the TT circuit 685 with an indication of what gain to employ.

As can be seen in FIG. 5, the circuitry necessary to selectively provide electric power with controllable voltage levels that serve as control signals, and the circuitry necessary to distinguish those voltage levels adds relatively minor complexity to the overall electrical architecture 2100.

Figure 6:
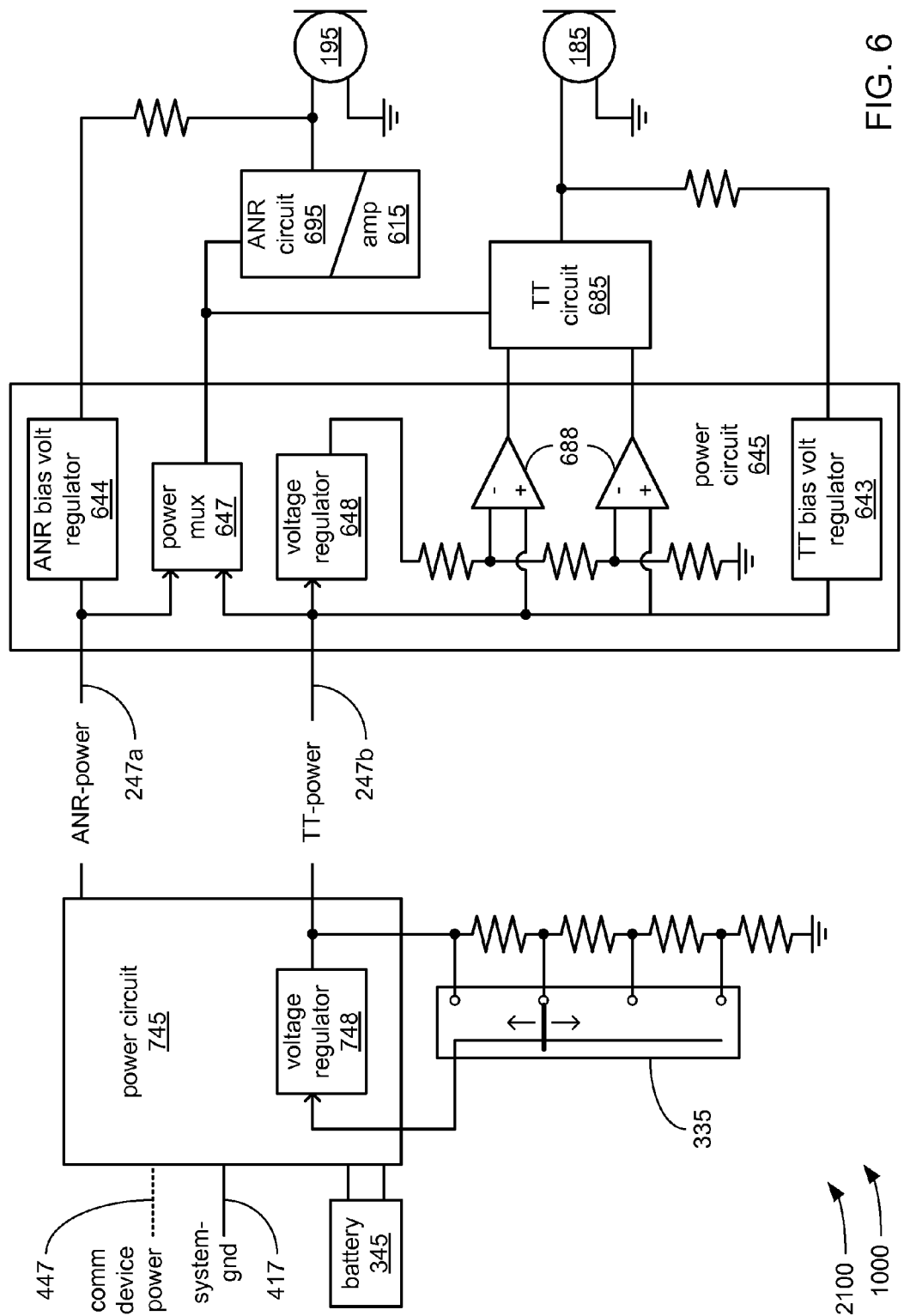
FIG. 6 is a block diagram of other possible subparts of the portions of FIG. 4.

FIG. 6 depicts alternate possible implementation details of subparts of the portions of the electrical architecture 2100 depicted in FIG. 4, most especially internal elements of the power circuits 645 and 745 of the electrical architecture 2100. The depiction of the power circuit 745, manually-operable control(s) 335 and battery 345 in FIG. 6 is very much the same as in FIG. 5.

Therefore, turning to the power circuit 645, as in FIG. 5, the power circuit 645 is again depicted as incorporating the power multiplexer 647, the voltage regulator 648, and the pair of comparators 688. Also again, the outputs of the comparators 688 are coupled to the TT circuit 685. However, in FIG. 6, the power circuit 645 is depicted as additionally incorporating a TT bias voltage regulator 643, an ANR bias voltage regulator 644, and the ANR circuit 695 is depicted as being more integrated with the amplifier 615. Also, in FIG. 6, the output of the power multiplexer is coupled to the ANR circuit 695 and the TT circuit 685. As previously discussed in this text, at least one of the microphones 195 is coupled to the ANR circuit 695, however, unlike what has been previously discussed, at least one an additional microphone 185 is coupled to the TT circuit 685, and further, the microphone 185 is not shared with the ANR circuit 695. In this depicted embodiment, it may be that the depicted microphone 195 is positioned within the acoustic volume enclosed by the casing of one of the earpieces 110 (i.e., positioned to enable its use as part of providing feedback-based ANR), while the depicted microphone 185 is carried on a portion of the headset 1000 that enables it be acoustically coupled to the environment external to at least that enclosed acoustic volume (i.e., positioned to enable its use as part of providing at least talk-through functionality).

The ANR bias voltage regulator 644 and the power multiplexer 647 are both coupled to and receive whatever electric power may be provided through the ANR-power conductor 247a. Similarly, the TT bias voltage regulator 643, the power multiplexer 647, the voltage regulator 648 and each of the two comparators 688 are coupled to and receive whatever electric power may be provided through the TT-power conductor 247b. The power multiplexer 647 selects from between the electric power provided on the ANR-power conductor 247a and the electric power provided on the TT-power conductor 247b, depending on whichever is provided at a higher voltage level relative to the system-gnd conductor 217 (not shown in FIG. 6 for sake of visual clarity). The power multiplexer 647 outputs the selected one of these to both the TT circuit 685 and the combination of the ANR circuit 695 and the amplifier 615. Presuming that electric power is provided to their respective inputs, the ANR bias voltage regulator 644 provides its regulated microphone bias voltage to the microphone 195 through a resistor, the TT bias voltage regulator 643 provides its regulated microphone bias voltage to the microphone 185, and the voltage regulator 648 provides its regulated reference voltage to the comparators 688 through the depicted voltage divider network made up of resistors.

The ANR circuit 695 and the amplifier 615 is depicted and discussed as combined herein in recognition of the high likelihood that the amplifier 615 would be included as a component of the electrical and acoustic feedback loop formed by the combination of the ANR circuit 695, the microphone 195 and one of the acoustic drivers 115 (not shown in FIG. 6 for sake of visual clarity). It is due to use of the amplifier 615 in driving the acoustic drivers 115 with whatever audio they are to acoustically output, this combination of the ANR circuit 695 and the amplifier 615 is always provided with electrical power through the multiplexer 647 when the provision of either ANR or talk-through is being enabled. Therefore, instead of controlling whether feedback-based ANR is provided by either providing or not providing electric power to the ANR circuit 695, this is instead done by either providing or not providing a bias voltage to the microphone 195 by selectively providing or not providing electric power to the ANR bias voltage regulator 644 through the ANR-power conductor.

The TT-circuit 685 is similarly always provided with electric power through the power multiplexer 647, regardless of whether that power is received via the ANR-power conductor 247a or the TT-power conductor 247b. Thus, controlling whether or not talk-through functionality is provided is similarly accomplished in a manner not unlike the controlling of ANR functionality, i.e., by either providing or not providing electric power to the TT bias voltage regulator 643 via the TT-power conductor 247b. However, in addition to the selective provision or lack of provision of electric power via the TT-power conductor 247b, whatever electric power may provided via the TT-power conductor 247b is able to be provided with a voltage level that can be varied as a mechanism to control a gain level employed in providing the talk-through functionality. In other words, at times when electric power is provided on the TT-power conductor 247b (thereby enabling the provision of a bias voltage to the microphone 185, and in turn, enabling the provision of TT functionality), the gain by which voice sounds detected by the microphone 185 may be passed through and acoustically output by at least one of the acoustic drivers 115 is selectable through the provision of that electric power at different voltage levels. These differing voltage levels are detected by the comparators 688, which compare the voltage level of the electric power received via the TT-power conductor 247b to the regulated voltage output of the voltage regulator 648.

It should be noted that although a single system-gnd conductor extending between the audio circuit 600 and the control circuit 700 has been depicted and discussed herein as being employed as the return path for both the provision of electric power and the provision of left and right audio channels to the acoustic drivers 115, other electrical architectures are envisioned in which separate ground conductors are employed as the return path for the provision of power and as the return path for the provision of left and right audio signals to the acoustic drivers 115. Although at least in the aviation field, it is common practice for an ICS to employ a single common ground conductor for these two functions, and therefore, it is likely that the lower cable 400 would convey a single common ground conductor from the communications device 9000 to the control box 300 (at least where the communications device 9000 is an ICS of an airplane), in alternate electrical architectures, separate ground conductors for these two functions may be provided within the upper cable 200 in which they are coupled to each other only at the location of the control circuit 700, and maintained as separate within the audio circuit 600. Indeed, it may be that such separation in ground conductors may be extended through the lower cable 400 such that they are coupled to each other only at the location of the connector(s) 490.

Other embodiments and implementations are within the scope of the following claims and other claims to which the applicant may be entitled.

The invention claimed is:

1. A communications headset comprising:
a head assembly comprising:
an earpiece comprising a casing and an acoustic driver disposed therein; and
a first microphone positioned relative to the casing of the earpiece towards the vicinity of a mouth of a user of the communications headset;
an audio circuit electrically coupled to at least the acoustic driver to perform at least two different functions of the communications headset;
a control circuit; and
a first cable comprising a first conductor and a second conductor electrically coupling the control circuit to the audio circuit to enable the control circuit to provide electric power to the audio circuit to perform the at least two different functions, wherein:
at least one portion of one of the audio circuit is disposed within a portion of the head assembly;
which of the two different functions is performed by the audio circuit is determined by a voltage level of the electric power provided by the control circuit to the audio circuit via the first and second conductors; and
the voltage level is selected by the control circuit from a plurality of predetermined voltage levels based on instructions received by the control circuit indicating which of the two different functions is to be performed.

2. The communications headset of claim 1, wherein:
the first microphone is disposed on a microphone boom extending towards the vicinity of a mouth of a user from the casing of the earpiece;
the at least one portion of the audio circuit is disposed within the casing of the earpiece;
the control circuit is disposed within a control box; and
the first cable extends between the casing of the earpiece and the control box.

3. The communications headset of claim 1, wherein the at least two functions are selected from a group consisting of feedback-based ANR, feedforward-based ANR, talk-through, a diagnostic mode, and wireless communications with a wireless device.

4. The communications headset of claim 1, wherein the at least two functions comprise operating the audio circuit at least two different gain settings.

5. The communications headset of claim 1, wherein the electric power provided by the control circuit to the audio circuit is provided to the control circuit by at least one of a battery of the communications headset and a second cable coupled to the control circuit and comprising at least one connector enabling the second cable to be coupled to a communications device.

6. The communications headset of claim 5, wherein the control circuit monitors the electric power provided by the at least one of the battery and the communications device, and the availability of electric power provides the instructions based on which the control circuit selects the voltage level from among the plurality of voltage levels.

7. The communications headset of claim 1, further comprising a manually-operable control coupled to the control circuit and operable by a user of the communications headset to enable the user to provide the instructions indicating which of the two different functions is to be performed.

8. The communications headset of claim 1, wherein
the two different functions performed by the audio circuit comprise active noise reduction (ANR) and talk-through,
the audio circuit is further configured to provide the talk-through function at a plurality of gain levels,
the plurality of predetermined voltage levels includes at least three different voltage levels, and
the audio circuit determines which of ANR or talk-through to provide, and what gain level to use if talk-through is provided, based on which of the plurality of predetermined voltage levels the control circuit provides to the audio circuit.

9. The communications headset of claim 1, wherein
the control circuit comprises a voltage regulator, a resistor network, and a manual input switch having multiple positions,
the resistor network and the manual input switch are connected between a regulated output and a feedback input of the voltage regulator, and
each position of the switch causes the resistor network to couple a different portion of the voltage from the regulated output to the feedback input,
such that the voltage regulator provides one of the plurality of predetermined voltage levels to the first conductor.

10. The communications headset of claim 1, wherein
the audio circuit comprises a power supply circuit comprising a voltage regulator, a resistor network, and at least two comparators,
a regulated output of the voltage regulator is coupled to negative terminals of the comparators through the resistor network,
such that when the voltage regulator provides a regulated voltage output, a different portion of the regulated voltage is present at each of the negative terminals of the comparators, the different portions each corresponding to one of the plurality of predetermined voltage levels provided by the control circuit, and the first conductor of the first cable is coupled to an input of the voltage regulator and to a positive terminal of each of the comparators, such that for each of the predetermined voltage levels provided by the control circuit that is high enough to power the voltage regulator, a different number of the comparators will have a lower voltage present at the comparator's negative input than is present on the first conductor, causing each such comparator to activate, and the number of comparators that are activated determines which function is provided by the audio circuit.

* * * * *